(12) United States Patent
Yevstratov et al.

(10) Patent No.: US 8,837,927 B2
(45) Date of Patent: Sep. 16, 2014

(54) TRIAXIAL CAMERA SUSPENSION UNIT

(71) Applicants: Lev Nikolaevich Yevstratov, Los Angeles, CA (US); Vladimir Vladimirovich Kozlov, Moscow (RU)

(72) Inventors: Lev Nikolaevich Yevstratov, Los Angeles, CA (US); Vladimir Vladimirovich Kozlov, Moscow (RU)

( * ) Notice: Subject to any disclaimer, the term of this patent is extended or adjusted under 35 U.S.C. 154(b) by 90 days.

(21) Appl. No.: 13/673,744

(22) Filed: Nov. 9, 2012

(65) Prior Publication Data

US 2013/0192395 A1 Aug. 1, 2013

(51) Int. Cl.
| | |
|---|---|
| *G03B 39/00* | (2006.01) |
| *G03B 17/56* | (2006.01) |
| *F16M 11/20* | (2006.01) |
| *F16M 13/02* | (2006.01) |
| *F16H 21/52* | (2006.01) |
| *F16M 11/18* | (2006.01) |
| *F16M 11/12* | (2006.01) |
| *F16M 11/10* | (2006.01) |

(52) U.S. Cl.
CPC .............. *F16H 21/52* (2013.01); *G03B 17/561* (2013.01); *F16M 11/2071* (2013.01); *F16M 13/027* (2013.01); *F16M 11/18* (2013.01); *F16M 11/12* (2013.01); *F16M 11/10* (2013.01)
USPC ............... 396/13; 396/12; 396/419; 396/427; 396/428; 248/284.1

(58) Field of Classification Search
USPC ........................ 396/12, 13, 419, 427, 428, 55; 248/274.1, 660, 184.1, 550, 637; 348/143, 208.7
See application file for complete search history.

(56) References Cited

U.S. PATENT DOCUMENTS

| | | | | |
|---|---|---|---|---|
| 4,044,364 | A * | 8/1977 | Prinzo ........................... | 396/428 |
| 4,752,791 | A * | 6/1988 | Allred .............................. | 396/13 |
| 6,095,011 | A * | 8/2000 | Brogårdh .................... | 74/490.03 |
| 6,425,303 | B1 * | 7/2002 | Brogårdh et al. .......... | 74/490.03 |
| 6,579,016 | B2 * | 6/2003 | Chapman ..................... | 396/428 |
| 7,068,927 | B2 * | 6/2006 | Itzkowitz ........................ | 396/13 |
| 7,658,555 | B1 * | 2/2010 | Moilanen ..................... | 396/427 |
| 7,854,556 | B2 * | 12/2010 | Wood ............................ | 396/428 |

(Continued)

*Primary Examiner* — Terrell McKinnon
*Assistant Examiner* — Michael McDuffie
(74) *Attorney, Agent, or Firm* — The Eclipse Group LLP

(57) ABSTRACT

The invention relates to a suspension system designed for use with optical devices, such as video cameras. The camera suspension unit includes a platform, outer and middle frames, with the orthogonal intersecting axes of rotation at the midpoint of the unit, rotating drives to rotate the unit about the X, Y and Z axes all controlled by a control unit. The middle frame of the suspension unit is designed as a mechanical parallelogram, having a movable jointed foot, a piston-rod and two cranks, as well as two mechanical links, all of which have an axis of rotation parallel to the middle frame axis of rotation, which is parallel to the Y axis. The outer end of each mechanical link is fastened to a crank while the inner end is fastened to the frame. The inner ends are fastened in a rotatable manner, allowing for the rotation about an axis parallel to the axes of rotation of the cranks. The outer frame of the suspension unit, the foot of the parallelogram, two mobile mechanical links and the cranks, are all joined together, to form two parallelograms. The platform is rotatably fastened to the middle frame or parallelogram on at least one end with a piston-rod, and the axis of rotation of the platform is perpendicular to the axes of rotation of the piston-rod in relation to the cranks. The axis of rotation of the platform and cranks intersect.

1 Claim, 3 Drawing Sheets

(56) References Cited

U.S. PATENT DOCUMENTS

| | | | |
|---|---|---|---|
| 7,955,006 B1 * | 6/2011 | Harvey | 396/428 |
| 8,000,588 B1 * | 8/2011 | Harvey | 396/12 |
| 8,077,212 B2 * | 12/2011 | Chapman | 348/208.7 |
| 2003/0076480 A1 * | 4/2003 | Burbulla | 352/243 |
| 2009/0148150 A1 * | 6/2009 | Valles Navarro et al. | 396/428 |
| 2009/0179127 A1 * | 7/2009 | Pettey | 248/276.1 |

* cited by examiner

TRIAXIAL CAMERA SUSPENSION UNIT

RELATED APPLICATIONS

This application claims priority of Russian Patent Application No. 2011145318, filed on Nov. 9, 2011, titled TRIAXIAL CAMERA SUSPENSION UNIT, which application is incorporated in its entirety by reference in this application.

BACKGROUND OF THE INVENTION

1. Field of the Invention

The invention relates to a suspension unit for optical devices, and in particular, to a suspension unit for mobile mounting of optical devices, such as cameras and video cameras.

2. Related Art

A triaxial gyroscopic stabilizer for movie or television cameras is known (U.S. Pat. No. 6,354,750), which comprises a platform on which a camera is mounted on, outer and middle frames of the suspension unit, with the orthogonal in a midposition axes of rotation, intersecting in one point, rotating drives of the frames and a platform, all connected to a control signal output.

Another triaxial gyroscopic stabilizer for movie or television camera is taught by (U.S.Pat. No. 5,868,031). The suspension unit of the gyroscopic stabilizer of the '031 patent includes a platform on which a camera is mounted, outer and middle frames of the suspension unit, with orthogonal mid-positioned axes of rotation, intersecting in one point, rotating drives of the frames and a platform, connected to a control signal output. The outer frame construction of this the suspension unit is, however, asymmetrical in relation to the axis of its rotation and the rotating drive of the middle frame is located in a rear side of the camera. Both features of which create disadvantages in design. These features cause the center of mass of the outer frame displaced in relation to the axis of its rotation. When moving at high speeds, the suspension unit, unbalanced moments about axis of rotation of the frame are created, which causes errors in angular position of the platform in relation to the set control signal position, and degrade shot material quality.

Asymmetrical construction of the outer and middle frames of the suspension unit about the axis of the outer frame also causes aerodynamic asymmetry of the suspension unit with the camera in relation to this axis. Wind loading during shooting outdoors when mounted on a car or boat in motion, for example, also causes increasing aerodynamic torsional moment and increasing errors of the platform angular position, which also reduces image capture quality.

Moreover, in this prior art device, a middle axis of rotation of the suspension unit drives rotation of the middle frame, which is structurally placed behind the camera. This limits the longitudinal size of the camera with a lens when on the platform. It further complicates access to the camera and a cassette at service, narrows technical facilities of the suspension unit, and does not allow the use of wide line or long-focus lenses or other optical devices set in front of the lens of the camera (i.e., sun blends, a compendium and other).

A need therefore exists for increasing of the cameras angular position by reducing torsional moments generated by the suspension unit and expanding technical facilities of the suspension unit by improving operating features. A further need exists for a suspension unit having a symmetrical structural design of the outer and middle frames of the suspension unit and further locating the structural elements of the suspension unit such that they do not limit the longitudinal size of the camera with the lens when mounted on a platform.

SUMMARY

The invention relates to a suspension system designed for use with optical devices, such as video cameras. The camera suspension unit includes a platform, outer and middle frames, with the orthogonal intersecting axes of rotation at the midpoint of the unit, rotating drives to rotate the unit about the X, Y and Z axes all controlled by a control unit. The middle frame of the suspension unit is designed as a mechanical parallelogram, having a movable jointed foot, a piston-rod and two cranks, as well as two mechanical links, all of which have an axis of rotation parallel to the middle frame axis of rotation, which is parallel to the Y axis. The outer end of each mechanical link is fastened to a crank while the inner end is fastened to the frame. The inner ends are fastened in a rotatable manner, allowing for the rotation about an axis parallel to the axes of rotation of the cranks. The outer frame of the suspension unit, the foot of the parallelogram, two mobile mechanical links and the cranks, are all joined together, to form two parallelograms. The platform is rotatably fastened to the middle frame or parallelogram on at least one end with a piston-rod, and the axis of rotation of the platform is perpendicular to the axes of rotation of the piston-rod in relation to the cranks. The axis of rotation of the platform and cranks intersect.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
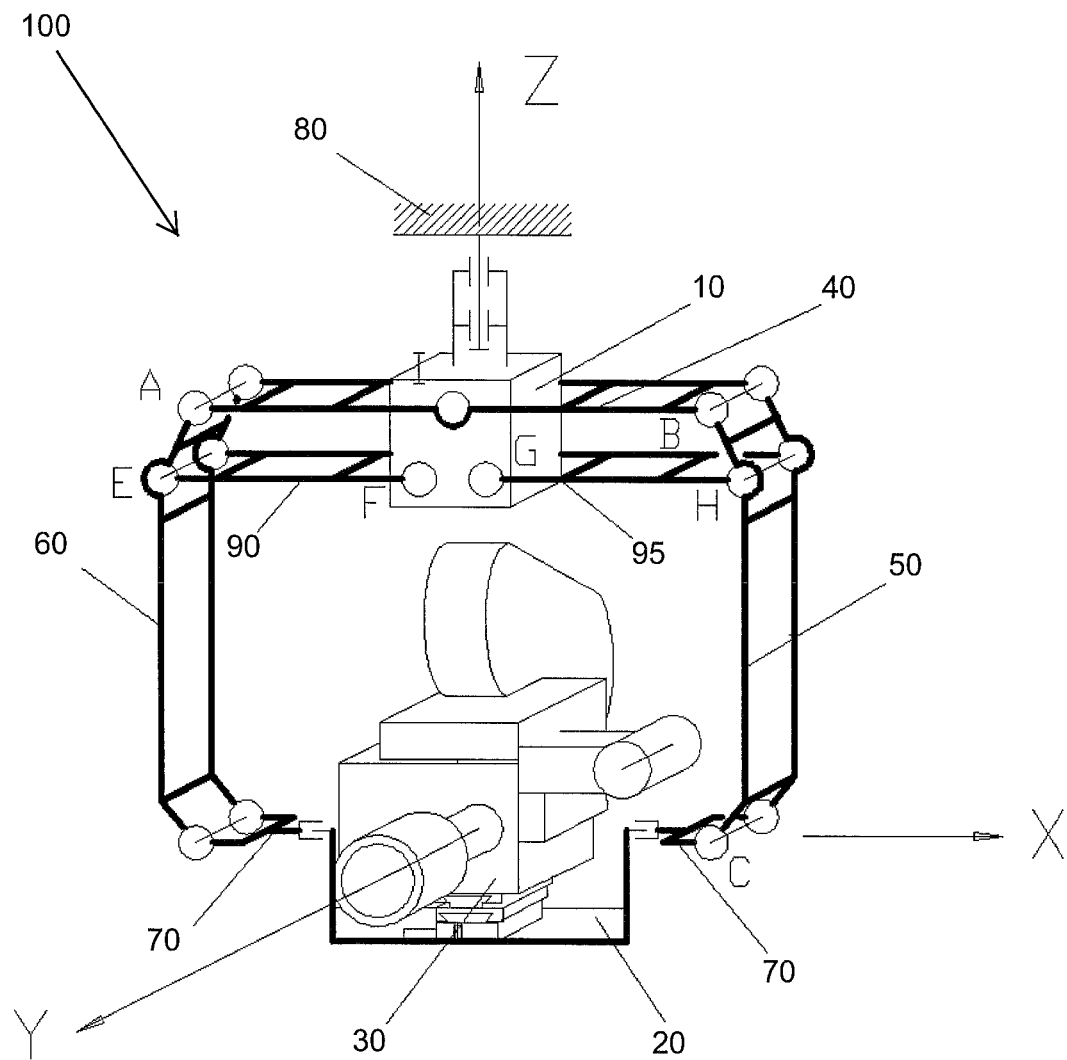
FIG. 1 illustrates on example of a perspective view of a camera suspension unit of the present invention.

FIG. 1 illustrates on example of a perspective view of a camera suspension unit 100 of the present invention. As illustrated in FIG. 1, the suspension unit 100 comprises an outer frame 10, a middle frame, comprised of a mechanical parallelogram ABCD, and a platform 20, on which a camera 30 is mounted. The outer frame 10 of the suspension unit 100 has one angular degree of freedom about a rotation axis Z of the frame 10. This angular rotation allows the suspension system to move the camera right and left. An angular degree of freedom about the X axis, allowing the camera to move up and down, and an angular degree of freedom about the Y axis, allowing the camera to rotate about the Y axis or be angled up or down.

The middle frame is a mechanical parallelogram ABCD. The mechanical parallelogram consists of foot 40, which spans between connectors (AB), cranks 50 and 60, which span between connectors (BC) and (AD), respectively, and piston-rods 70, which are positioned between and connected to connectors (CD). The foot 40, cranks 50 and 60 and platform 20 are all connected to one another via rotational joint connectors I, E and H and hinged connectors at A, B, C, D and F, G. To create depth and stability to accommodate a camera on the platform 20, the middle frame may be duplicated such that two frames are positioned at a predetermined space from one another, as illustrated in FIGS. 1-3.

The platform 20 is rotatably fastened on each side to at least one piston-rod 70 that rotates the platform 20 about the X-axis, thereby allowing the platform to move the camera up and down. This relative rotation is perpendicular to, and intersects with, the axes of rotation of the cranks 50 and 60 about hinges of D and C). The foot 40 of the parallelogram is fastened on the outer frame 10, and is able to rotate about the Y axis, which is parallel to the axis of the middle frame (hinge I) and intersects with the axis of the outer frame 10.

The middle frame ABCD further includes mobile mechanical links 90 (EF) and 95 (GH) pivotally connected to cranks 50 and 60 by connectors E and H, and provide another angle of rotation about the Y axis through the rotational movement of one end of the mechanical links 90 and 95 (E or H) about the axis. Interior ends (FG) of the mechanical links 90 and 95 are rotatably fastened with hinges to the outer frame 10, which allow for rotational of the middle frame about the Y-axis (hinges of F and G). Location of the rotation axes of the mobile mechanical links ends 90, 95 on the cranks 50, 60 and on the outer frame 10 is such, that they form two parallelograms together: AIEF and IBGH.

Figure 2:
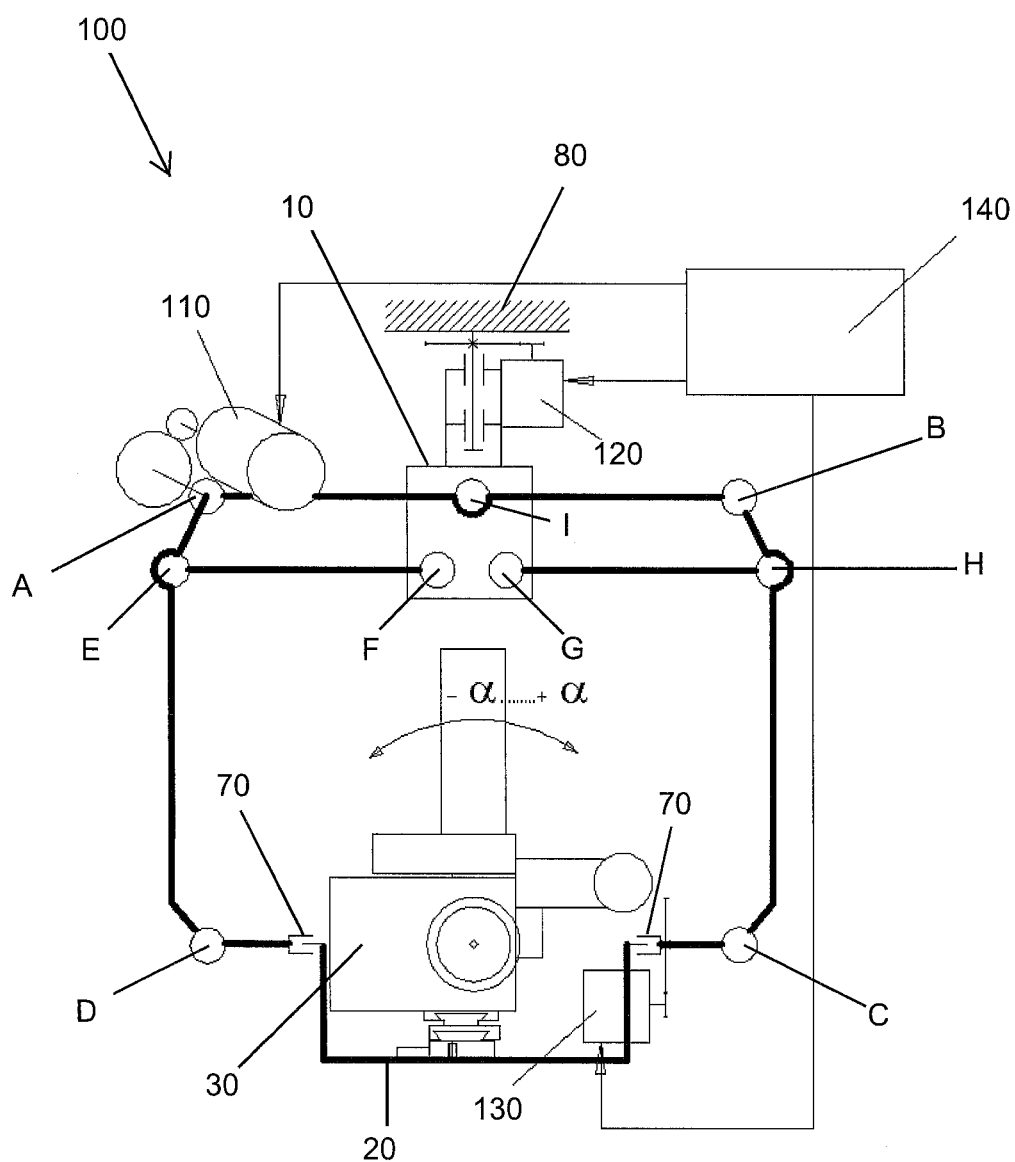
FIG. 2 illustrates a front view of the camera suspension unit of the FIG. 1 with the middle frame of the suspension unit in a mid-position.

FIG. 2 illustrates a front view of the camera suspension unit of the FIG. 1 with the middle frame of the suspension unit at a midpoint. FIG. 2 illustrates the drive units designed to move the pivotal connectors and piston rods 70 about the axes of the suspension unit X, Y, Z, which axes intersect in one point and are orthogonal at a midpoint. The rotation axis of the outer frame 10 about the Z axis is accomplished by drive unit 110. On the rotation of one link of the middle frame about the Y axis is accomplished by drive unit 120. The rotation of the platform 20 about the X axis is accomplished by drive unit 130. The drive units 110, 120 and 130 are controlled the control signal source 140 which are all connected to the control signal source 140 and receive signals form the control signal source 140 to activate the drive units 110, 120 and 130.

As illustrated in all the figures, the suspension unit 100 is mounted to a stationary mount or platform 80. Control signals, coming to the entrances of the drive units 110, 120, 130 set the angular position of the camera.

Movement of the suspension system along the X, Y and Z axis are all relative to the stationary mount 80. Movement of the outer frame 10 in relation to the mount 80 of the suspension unit 100 is carried out by a drive 120, guided by signals of the control signal source 14. Turn of the foot 40 of the parallelogram, the piston-rod 70 and motion of the elements of the middle frame connected to them in relation to the outer frame 10 is accomplished by drive unit 110, which is operated by the control signal source 140. The drive 110 can be set to provide the middle frame elements relative rotation about the Y axis (and applying the moment to the platform about the same axis), in any of hinges of the middle frame—A, B, C, D, E, F, G, H, I, in which a relative turn is taking place in rotation of the middle frame. Turn of the platform 20 and the camera 30 in relation to the middle frame takes a place about the axis X, wherein the platform 20 and the camera 30 turn in relation to the piston-rod 70 locates at least on one corner of the platform. This rotation and applying the managing moment to the platform about the axis X is carried out by the drive 130, guided by the control signal source 140.

Figures 3A, 3B:
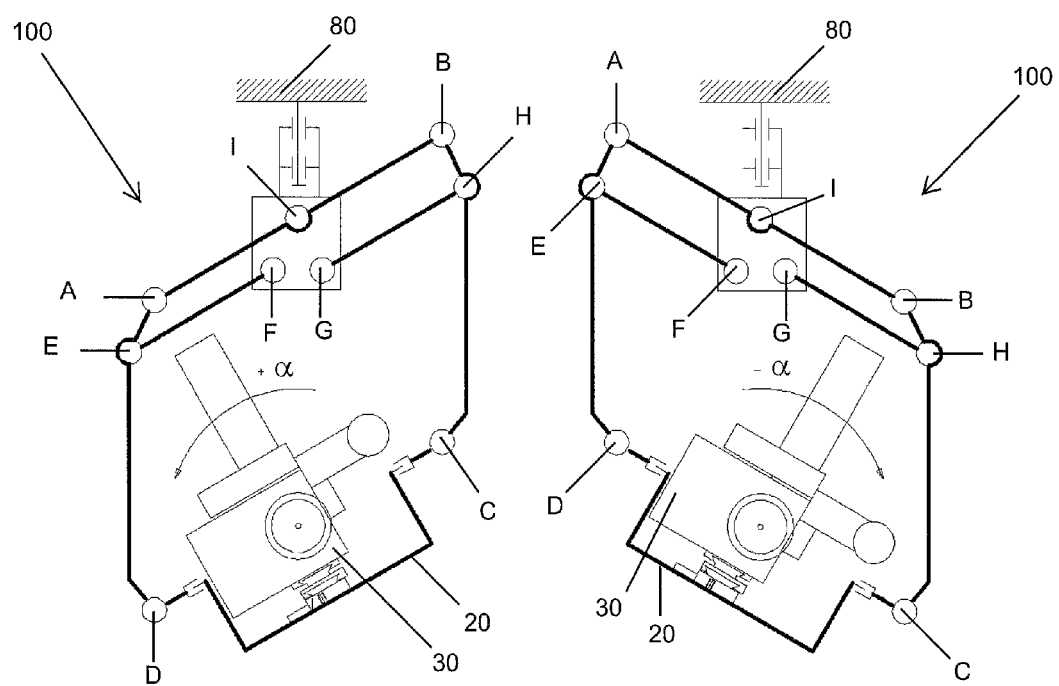
FIG. 3a illustrates a front view of the camera suspension unit of the FIG. 1 with the middle frame of the suspension unit in a first position.
FIG. 3b illustrates a front view of the camera suspension unit of the FIG. 1 with the middle frame of the suspension unit in a second position.

FIG. 3a illustrates a front view of the camera suspension unit of the FIG. 1 with the middle frame of the suspension unit in a first position and FIG. 3b illustrates a front view of the camera suspension unit of the FIG. 1 with the middle frame of the suspension unit in a second position.

FIGS. 3a and 3b illustrate the suspension unit being rotated about the axis Y. In this illustration the rotation of the suspension unit 100 and platform 20 relative to mount 80 remain unchanged and have not moved about the Z or X axis. All the movement of the suspension unit 100 is about the axis Y (FIG. 3.).

In operation, the outer frame 10, along with elements of the middle frame (40, 50, 60, 70, 90, 95) and the platform 20 (having a camera 30 mounted thereon) are able to rotate about the Z axis (right and left). It allows to the platform 20 and the camera 30 one angular degree of freedom about the axis Z. The suspension system 100, in operation, is also able to turn the camera about the axis X (up and down) by turning the piston-rods 70, which is able to rotate platform 20 and camera independent of the rest of the parallelogram ABCD, which gives platform 20 with the camera 30 a second angular degree of freedom.

Thus the axes X and Z are orthogonal and intersect in a point, which is on a line, connecting the axes of hinges D and C of the parallelogram ABCD and perpendicular to these axes. This line coincides with the rotation axis of the camera 20 in relation to the piston-rod 70, around which the platform 20 with the camera 30 has the third angular degree of freedom.

Links 90 and 95 include rotational connectors E and H on the cranks 50 and 60 and are further rotatably connected by hinge connectors F and G on the outer frame 10. These links 90 and 95 limit the motion of the cranks 50, 60 about the axes parallel to the X axis. As the hinge joints in that hinges A, B, C, D of the outer frame 10, the foot 40, the cranks 50, 60 and mobile kinematic links 90, 95 forms mechanical parallelogram AIEF and IBGH, these limitations cause the cranks 50, 60 to always remain in an unchanging angular orientation in relation to the outer frame 10 while the foot 40 turns and the piston-rod 70 turns in relation to the outer frame 10. Thus, when the platform 20 and the camera 30 turn relative to the X axis, the cranks 50 and 60 move forward.

The platform 2 with the camera 3 hangs on the parallelogram ABCD and fauns a pendulum about the Y axis with the distance from its axis of rotation, which is equal to the distance between the hinges B and C, A and D). Under acceleration along the X axis, movements arise trying to turn the cranks 50, 60 in relation to the outer frame 10. However, the parallelograms AIEF and IBGH do not allow the suspension system to carry out this turn. Meanwhile, the pendulum movement about the Y axis is absent because the acceleration acting along the axis X is compensated by the tension and compression forces moments of the mechanical links 90 and 95, and the moment about the axis Y of the middle frame, applied to the platform 20.

Balancing of the suspension unit can be conducted in three stages. At first, for providing of the suspension unit balancing about the axis Y, a general center-of-mass of the camera 30 and platforms 20 should be combined with the axis Y.

Then a general center-of-mass of the camera 30 and the platform 20 must be moved along the axis X until the middle frame be balanced jointly with the platform 20 and with the camera 30 about the axis which is parallel to the axis Y and passing through the hinge I, in position, when the axis Z is vertical.

Further for providing the suspension unit 100 balanced about the axis Z, it is necessary to combine a general center-of-mass of the middle frame elements and the outer frame 10 with the axis Z of the suspension unit, not moving the camera 30 position on the platform 20, and not moving the middle frame center-of-mass along the axis X, not to violate the balance around axes X and Y.

Symmetric structural execution of the outer and middle frames about the suspension unit 100 outer frame 10 axis of rotation allows to reduce moments of disbalance about the outer frame axis to the zero, in theory, and considerably decreases moments from aerodynamic asymmetry of the suspension unit 100 about an axis of the outer frame 10, created during setting of the suspension unit 10 on a moving car, a boat, an operator faucet, and therefore to provide reducing of angular position errors of the platform 20 in relation to the position set by the control signal source 140 and improvement of the quality of the material shot on the camera.

Transfer of the rotation supports of the middle frame, previously placed behind the camera, onto the middle frame elements, located on each side and on the top of the camera, extends technical feasibilities of the suspension unit 100 due to absence of longitudinal size limits of the camera with a lens. Accordingly, a camera with a lens can be set on the platform 20. The present structure also allows improved access to the camera 30 for service.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A triaxial camera suspension unit, comprising a platform on which a camera is mounted on, outer and middle frames of the suspension unit, with orthogonal in a midposition axes of rotation, intersecting in one point, rotating drives of the frames and the platform, connected to a control signal output, characterized in that the middle frame of the suspension unit is performed as a mechanical parallelogram, comprising a movable jointed foot of a parallelogram, a piston-rod and two cranks, with axes of rotation which are parallel to a middle frame axis of rotation, wherein the foot of the parallelogram is combined with the outer frame of the suspension unit with possibility of rotation about an axis which is parallel to the axis of the middle frame of the suspension unit and intersecting with it, one end of a mobile mechanical link is fastened to the each cranks with possibility of rotation about an axis, parallel to the axes of rotation of the cranks, the second ends of every mobile mechanical link are fastened on the outer frame with possibility of rotation about the axis, which is parallel to the axes of rotation of the cranks, so that joined the outer frame of the suspension unit, the foot of the parallelogram, two mobile mechanical links and the cranks form two mechanical parallelograms, the platform is fastened on the piston-rod with possibility of rotation, and the axis of rotation of the platform is perpendicular to the axes of rotation of the piston-rod in relation to the cranks and intersects with them.

* * * * *